United States Patent
Hu et al.

(10) Patent No.: US 11,520,160 B2
(45) Date of Patent: Dec. 6, 2022

(54) OPTICAL DEVICE

(71) Applicant: TDK TAIWAN CORP., Taoyuan (TW)

(72) Inventors: Chao-Chang Hu, Taoyuan (TW);
Shu-Shan Chen, Taoyuan (TW);
Chen-Hsien Fan, Taoyuan (TW);
Liang-Ting Ho, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 247 days.

(21) Appl. No.: 16/848,004

(22) Filed: Apr. 14, 2020

(65) Prior Publication Data
US 2020/0241315 A1 Jul. 30, 2020

Related U.S. Application Data

(63) Continuation of application No. 15/968,493, filed on May 1, 2018, now Pat. No. 10,656,431.

(60) Provisional application No. 62/502,055, filed on May 5, 2017.

(30) Foreign Application Priority Data

Apr. 10, 2018 (CN) .......................... 201820503709.7

(51) Int. Cl.
*G02B 26/08* (2006.01)
*G02B 27/64* (2006.01)
*G02B 7/09* (2021.01)
*H02K 41/035* (2006.01)

(52) U.S. Cl.
CPC ............. *G02B 27/646* (2013.01); *G02B 7/09* (2013.01); *G02B 26/0816* (2013.01); *G03B 2205/0023* (2013.01); *G03B 2205/0046* (2013.01); *G03B 2205/0084* (2013.01); *H02K 41/0356* (2013.01)

(58) Field of Classification Search
CPC .... G02B 27/646; G02B 7/09; G02B 26/0816; G03B 2205/0023; G03B 2205/0046; G03B 2205/0084; H02K 41/0356
USPC ....................................... 359/221.3
See application file for complete search history.

(56) References Cited

U.S. PATENT DOCUMENTS 9,753,280 B2 * 9/2017 Hofmann ........... G02B 26/0833
2016/0306168 A1 10/2016 Singh et al.

* cited by examiner

*Primary Examiner* — Euncha P Cherry
(74) *Attorney, Agent, or Firm* — Muncy, Geissler, Olds & Lowe, P.C.

(57) ABSTRACT

An optical module is provided. The optical module includes a first optical element driving mechanism. The first optical element driving mechanism includes a first movable portion, a first fixed portion, and a first driving assembly. The first movable portion connects an optical path adjustment element. The optical path adjustment element is configured to change a transmission direction of incident light to a first direction that is different from the transmission direction. The first fixed potion is polygonal when viewed in the transmission direction. The first movable portion is movable relative to the first fixed portion. The first driving assembly drives the first movable portion to move relative to the first fixed portion. The first driving assembly comprises a shape memory alloy. The first driving assembly is located on a first side of the first fixed portion when viewed in the transmission direction.

19 Claims, 14 Drawing Sheets

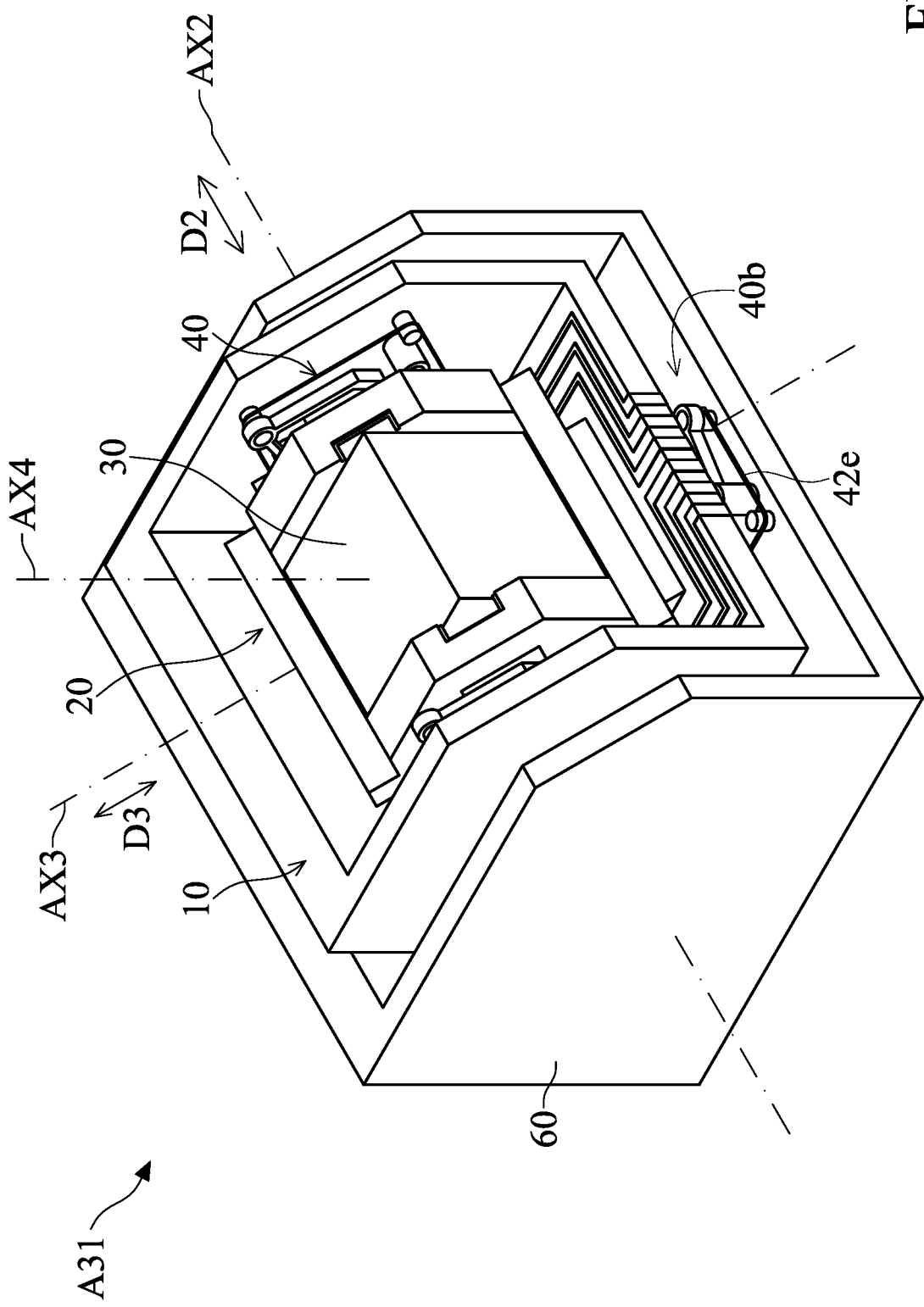

OPTICAL DEVICE

CROSS-REFERENCE TO RELATED APPLICATIONS

This application is a Continuation Application of U.S. patent application Ser. No. 15/968,493 (Pub. No. US 2018/0321504 A1), filed on May 1, 2018, which claims the benefit of U.S. Provisional Application No. 62/502,055, filed on May 5, 2017, and China Patent Application No. 201820503709.7, filed on Apr. 10, 2018, the entirety of which are incorporated by reference herein.

BACKGROUND OF THE INVENTION

Field of the Invention

The present disclosure relates to an optical device, and in particular to an optical device for use in portable electronic equipment.

Description of the Related Art

With technology has progressed, camera modules have come to be widely applied in portable electronic devices such as cell phones and tablet computers. In general, a camera module has a lens and an image sensor. Incident light can fall on the image sensor via the lens, and the image sensor generates an image signal according the incident light. For the camera module to achieve high image quality, the camera module utilizes a drive motor to adjust the position of the lens, thus facilitating auto-focus and auto-zoom control of the camera module.

Moreover, in most cases, when a user takes photographs using the portable electronic apparatus, it is mostly held by hand. In general, the image captured by the portable electronic apparatus can be blurry when there is insufficient light. In order to prevent the above deficiency, optical image stabilization is added to the camera module of the prior art.

In general, the conventional optical image stabilization includes a motor mechanism for driving an optical element. However, the electromagnetic field generated by the motor mechanism affects the lens control of the drive motor, and thus the quality of the image generated by the camera module is reduced. Accordingly, although conventional camera modules have generally been adequate for their intended purposes, they have not been entirely satisfactory in all respects. Consequently, it is desirable to provide a solution for improving camera modules.

BRIEF SUMMARY OF THE INVENTION

The present disclosure provides an optical device disposed in the portable electronic equipment. The optical device does not utilize a motor mechanism, which generates an electromagnetic field to archive the optical-image-stabilization function, and thus the quality of the image generated by the optical device is improved.

The present disclosure provides an optical device including a main base, a rotation mechanism, a carrying base, and an optical element. The rotation mechanism is connected to the main base. The carrying base is connected to the rotation mechanism. The optical element is disposed on the carrying base, and configured to change the transmission direction of an incident light. By changing the length of a bias wire of the rotation mechanism, the carrying base can be rotated relative to the main base about a first rotation axis.

In some embodiments, the bias wire includes a first conductive end and a second conductive end. The power source provides voltage to the bias wire via the first conductive end and the second conductive end, so as to change the length of the bias wire.

In some embodiments, the carrying base is pivoted on the main base. The bias wire has a first conductive end connected to the main base, and a second conductive end connected to the carrying base.

In some embodiments, the main base further includes a first connection portion, and the carrying base further includes a second connection portion. The bias wire is connected to the first connection portion and the second connection portion. The optical device further includes a second bias wire and a connection wire. The second bias wire is connected to the main base and the carrying base. The connection wire is disposed on the carrying base, and connected to the bias wire and the second bias wire.

In some embodiments, the rotation mechanism further includes an elastic element connected to the main base and the carrying base. The bias wire is around the elastic element. In some embodiments, the elastic element includes an elastic body disposed on the carrying base; an elastic arm connected to the elastic body; and a movable portion disposed on the elastic arm. The bias wire is in contact with the movable portion. When the length of the bias wire shortens, the bias wire moves the movable portion, and rotates the elastic body.

In some embodiments, the main base further includes a fixed portion. The far end of the elastic arm is connected to the fixed portion. In some embodiments, the main base includes a limitation portion, and the bias wire is in slidable contact with the limitation portion.

In some embodiments, the optical device further includes an elastic sheet disposed on the main base and the carrying base, and configured to provide an elastic force between the main base and the carrying base. In some embodiments, the elastic sheet further includes a shaft portion extending along the first rotation axis.

In some embodiments, the rotation mechanism further includes a third bias wire. The carrying base is rotated relative to the main base about a first rotation direction by changing the length of the first bias wire. The carrying base is rotated relative to the main base in a second rotation direction by changing the length of the third bias wire.

In some embodiments, the optical device further includes a second rotation mechanism connected to the main base and the carrying base. The carrying base is rotated relative to the main base about a second rotation axis by changing the length of a fourth bias wire of the second rotation mechanism.

In some embodiments, the optical device further includes an outer main base movably disposed on the main base; and a third rotation mechanism connected to the outer main base and the main base.

In some embodiments, an extension direction of the bias wire is perpendicular to the first rotation axis. In some embodiments, the bias wire is located on an imaginary plane, and the imaginary plane is not parallel to the first rotation axis. In some embodiments, the bias wire and the carrying base are arranged in an extension direction of the first rotation axis. In some embodiments, the incident light passing through the optical element is transmitted along a light axis, and the first rotation axis is not parallel to the light axis.

In some embodiments, the optical device further includes a lens is adjacent to the optical element, wherein the lens and the optical element are arranged in a direction that is not parallel to the first rotation axis.

In some embodiments, the optical device further includes a drive assembly is adjacent to the optical element, and configured to move the lens. In some embodiments, the drive assembly includes a magnetic element, and a drive coil corresponding to the magnetic element.

In conclusion, the optical device of the present disclosure can be disposed in the portable electronic equipment and provide the function of optical image stabilization. Moreover, the length of bias wire can be adjusted by applying voltage to the bias wire, and the optical element of the optical device can be rotated by changing the length of bias wire. Therefore, the optical device does not utilize a mechanism, which generates electromagnetic field to archive the optical-image-stabilization function, and thus the quality of the image generated by the optical device is improved.

BRIEF DESCRIPTION OF THE DRAWINGS

The invention can be more fully understood by reading the subsequent detailed description and examples with references made to the accompanying drawings, wherein:

FIG. 6 is a perspective view of an optical device in accordance with the fifth embodiment of the present disclosure.

DETAILED DESCRIPTION OF THE INVENTION

Figure 1:
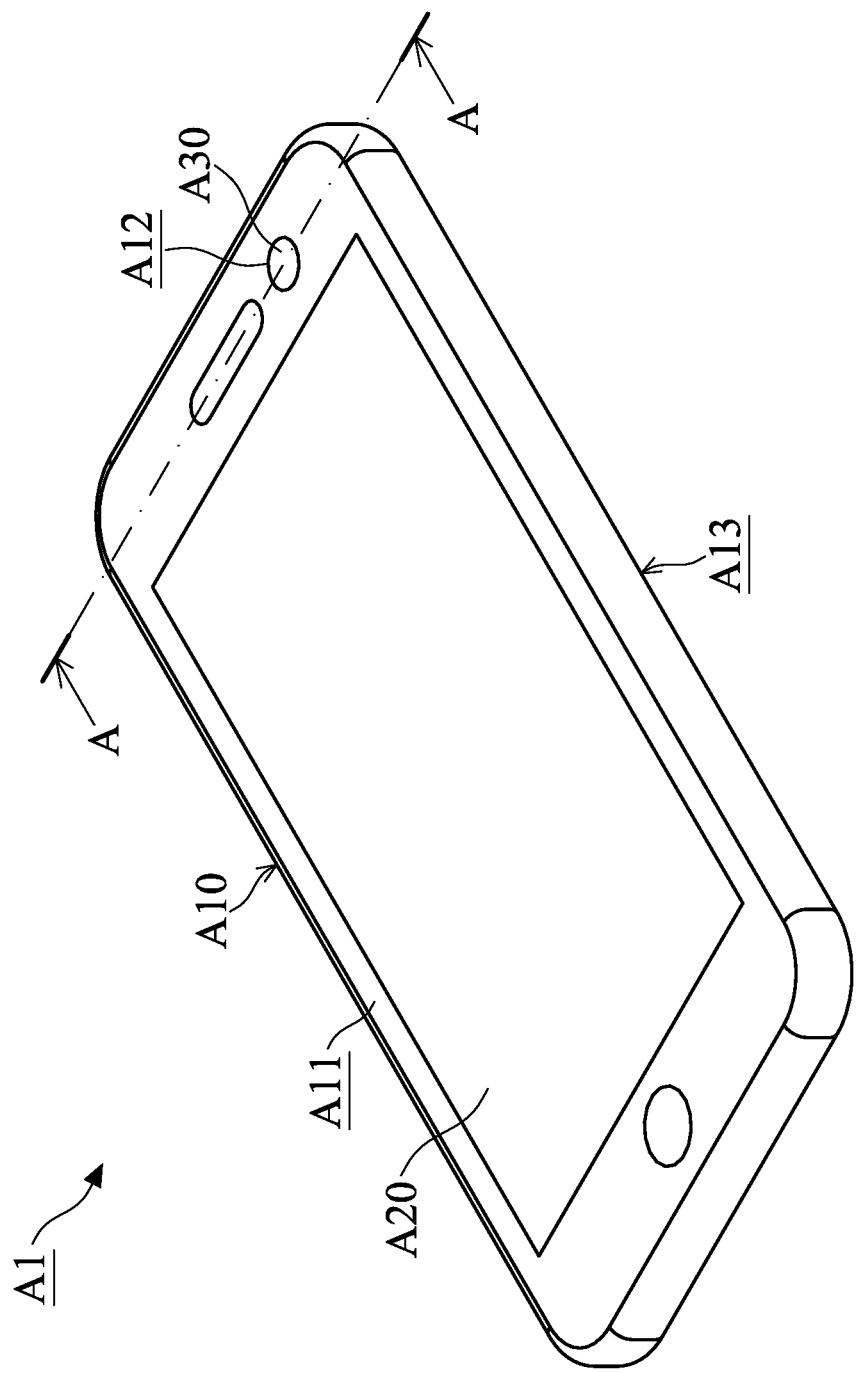
FIG. 1 is a perspective view of portable electronic equipment in accordance with some embodiments of the present disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed.

The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. Moreover, the shape, size, thickness, and angle of inclination depicted in the drawings may not be drawn to scale or may be simplified for clarity of discussion; these drawings are merely intended for illustration.

Figure 2:
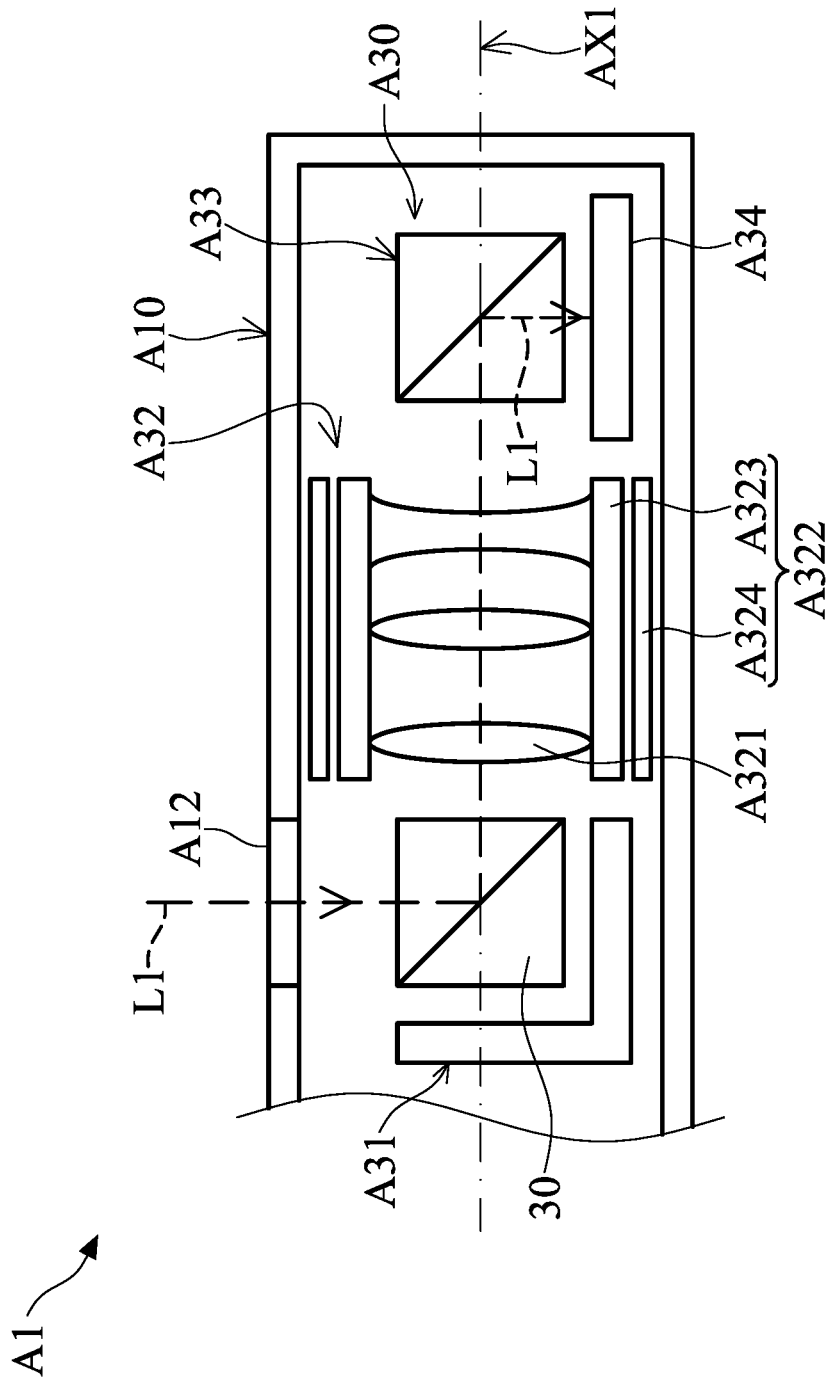
FIG. 2 is a cross-sectional view of the AA section of FIG. 1.

FIG. 1 is a perspective view of a portable electronic equipment A1 in accordance with some embodiments of the present disclosure. FIG. 2 is a cross-sectional view of the AA section of FIG. 1. The portable electronic equipment A1 may be a smart phone, a tablet computer, or a smart watch. The portable electronic equipment A1 includes an outer housing A10, a display panel A20, and at least one camera module A30. The outer housing A10 may be a plate structure. In some embodiments, the thickness of the outer housing A10 is in a range from about 5 mm to 10 mm. The display panel A20 is disposed on a display surface A11 of the outer housing A10, and configured to display an image.

The camera module A30 is disposed in the outer housing A10, and corresponds to a light hole A12 of the outer housing A10. The incident light L1 can fall on the camera module A30 via the light hole A12, and the camera module A30 generates image signals according to the incident light L1 falling thereon. The display panel A20 displays an image according to the image signals. In some embodiments, the camera module A30 has the functions of auto focus, auto zoom, and optical image stabilization.

For clarity, there are one light hole A12 and one camera module A30 are illustrated in the figures of the present disclosure. In some embodiments, there are light holes A12 disposed on the rear surface A13 and/or the display surface A11 of the outer housing A10, and there are light holes A12 corresponding to different camera modules A30.

The camera module A30 includes am optical device A31, a lens assembly A32, a reflective element A33, and an image sensor A34. The optical device A31, the lens assembly A32 and the reflective element A33 are arranged along the light axis AX1. The incident light L1 enters into the outer housing A10 via the light hole A12, and falls on the image sensor A34 via the optical device A31, the lens assembly A32, and the reflective element A33 in sequence.

The optical device A31 may be an optical reflector, configured to change the transmission direction of the incident light L1, so as to make the incident light L1 transmitted along the light axis AX1. The lens assembly A32 may include lenses A321 and a drive assembly A322. The lenses A321 are arranged along the light axis AX1. The drive assembly A322 is configured to move the lenses A321 along the light axis AX1, so as to change the distance between the lenses A321 and the reflective element A33 (or the image sensor A34). Accordingly, auto-focus and auto-zoom control of the camera module A30 can be achieved.

In this embodiment, the drive assembly A322 includes a magnetic element A323, and a drive coil A324 corresponding to the magnetic element A323. The lenses A321 are connected to the magnetic element A323. By applying current to the drive coil A324, a magnetic force is generated between the drive coil A324 and the magnetic element A323 by the drive coil A324, and thus the magnetic element A323 can be moved by the magnetic force.

The reflective element A33 is configured to change the transmission direction of the incident light L1, and to make the incident light L1 falling on the image sensor A34. In this embodiment, the reflective element A33 may be a reflective mirror, a reflective prism, or a beam splitter.

The image sensor A34 generates image signals according to the incident light L1 falling thereon. In some embodiments, the image sensor A34 may be a Complementary Metal-Oxide-Semiconductor (CMOS) sensor.

Figure 3A:
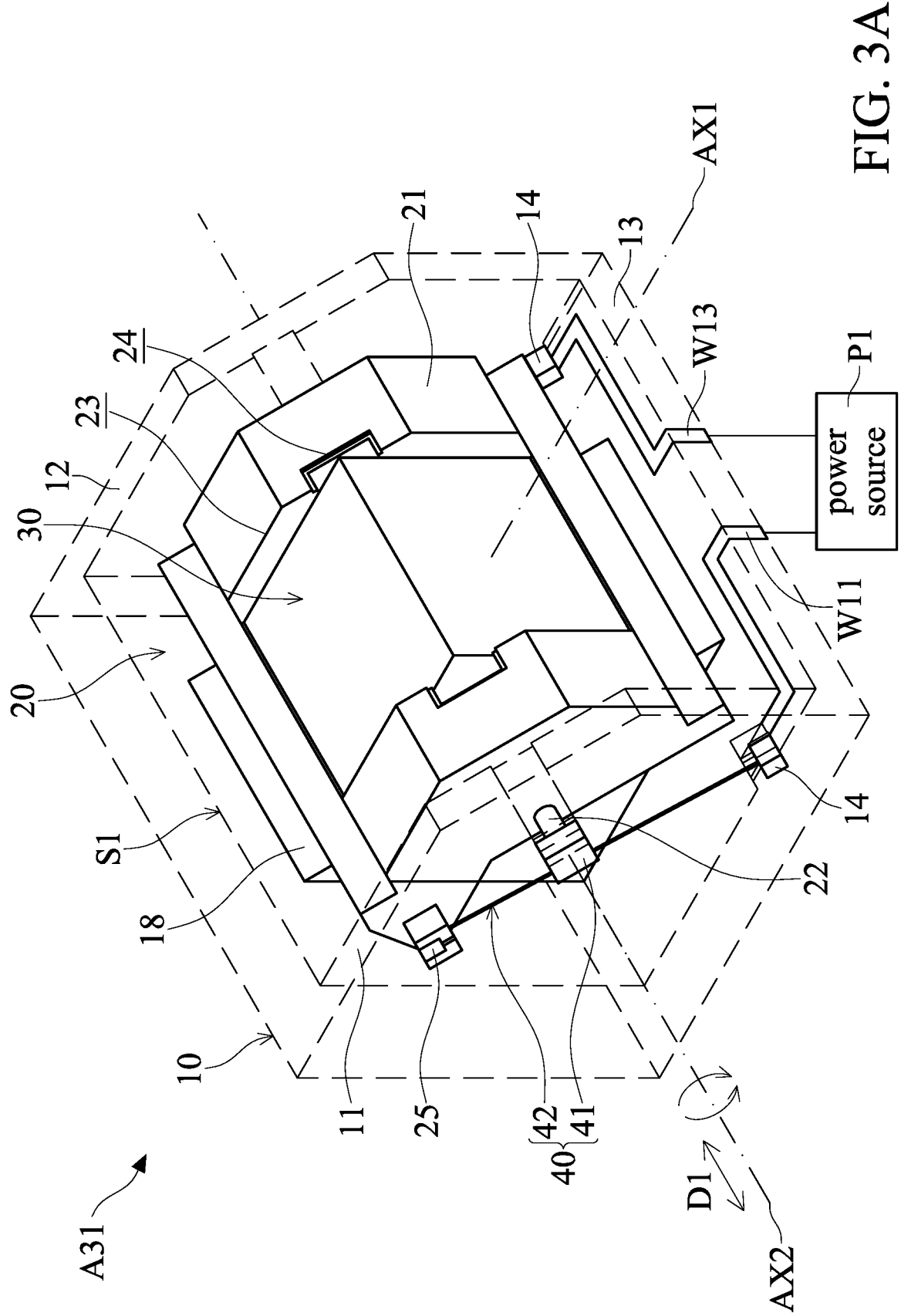
FIG. 3A is a perspective view of an optical device in accordance with the first embodiment of the present disclosure.
Figure 3B:
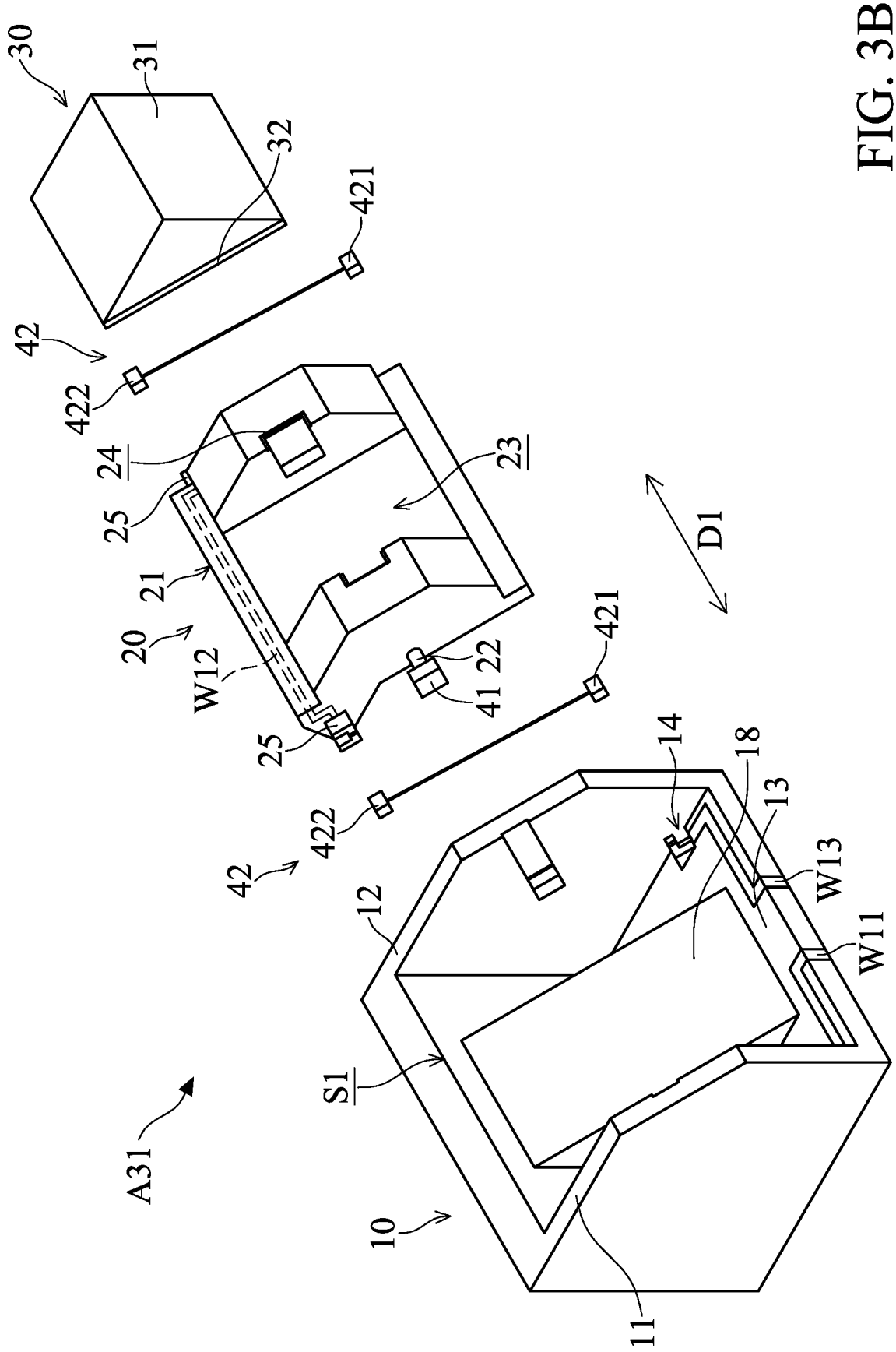
FIG. 3B is an exploded view of the optical device in accordance with the first embodiment of the present disclosure.
Figure 3C:
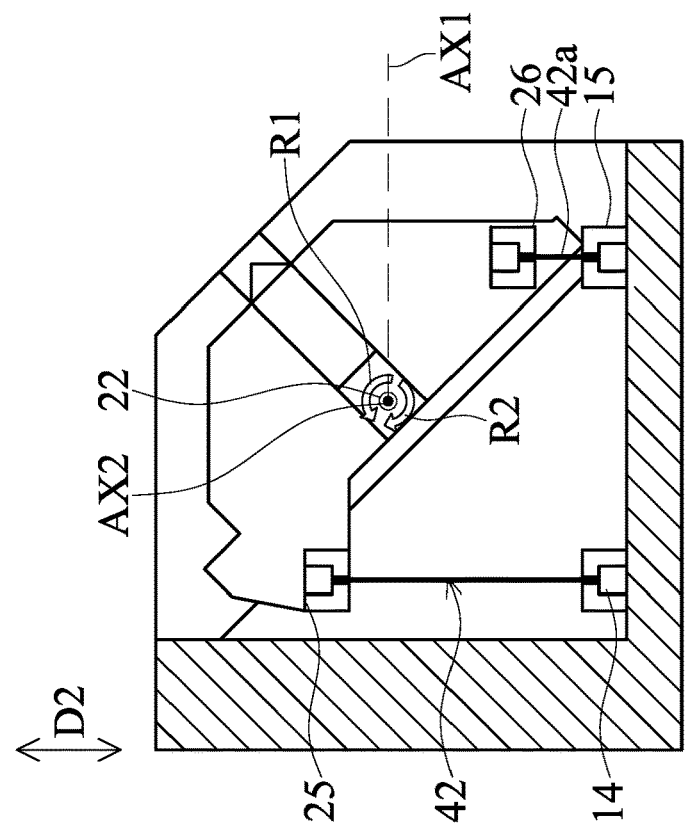
FIG. 3C is a schematic view of the optical device in accordance with the first embodiment of the present disclosure.

FIG. 3A is a perspective view of an optical device A31 in accordance with the first embodiment of the present disclosure. FIG. 3B is an exploded view of the optical device A31 in accordance with the first embodiment of the present disclosure. FIG. 3C is a schematic view of the optical device A31 in accordance with the first embodiment of the present disclosure. The optical device A31 includes a main base 10, a carrying base 20, an optical element 30, and a rotation mechanism 40.

The main base 10 includes a first side wall 11, a second side wall 12, and a bottom plate 13. The first side wall 11 and the second side wall 12 may be extended perpendicular to the bottom plate 13. A receiving space S1 is formed between the first side wall 11 and the second side wall 12. In other words, the first side wall 11 is parallel to and corresponds to the second side wall 12, and is separated from the second side wall 12.

The carrying base 20 is rotatably disposed in the receiving space S1 of the main base 10. The carrying base 20 can be rotated relative to the main base 10 about the first rotation axis AX2. As shown in FIGS. 2 and 3A, the first rotation axis AX2 is not parallel to the light axis AX1. In some embodiments, the first rotation axis AX2 is substantially perpendicular to the light axis AX1. The carrying base 20 may be pivoted on the first side wall 11 and the second side wall 12 of the main base 10.

The carrying base 20 may be a carrying body 21, two pivoting portions 22, and a receiving groove 23. The carrying body 21 is rotatably disposed in the receiving space S1 of the main base 10. The pivoting portions 22 are disposed on two opposite sides of the carrying body 21, and pivoted on the first side wall 11 and the second side wall 12. The pivoting portions 22 may be extended along the first rotation axis AX2. In some embodiments, the pivoting portions 22 are disposed on the first side wall 11 and the second side wall 12, and pivoted to the carrying body 21. The receiving groove 23 is formed on the carrying body 21.

The optical element 30 is disposed in the receiving groove 23 of the carrying base 20, and configured to change the transmission direction of the incident light L1. The shape of the receiving groove 23 corresponds to the shape of the optical element 30, so as to make the optical element 30 to be securely disposed in the carrying base 20. In this embodiment, the incident light L1 passing through the optical element 30 may be transmitted along the light axis AX1.

As shown in FIG. 2, the optical element 30 is adjacent to the lenses A321 of the lens assembly A32. The optical element 30 and the lenses A321 are arranged in a direction that is not parallel to the first rotation axis AX2. In this embodiment, the optical element 30 and the lenses A321 are arranged along the light axis AX1, which is substantially perpendicular to the first rotation axis AX2.

The optical element 30 may be a reflective mirror, a reflective prism, or a beam splitter. In this embodiment, as shown in FIG. 3B, the optical element 30 includes a transparent body 31 and a reflective film 32. The transparent body 31 may be a triangular prism. The reflective film 32 is disposed on the surface of the transparent body 31, and may be in contact with the carrying base 20.

In this embodiment, the carrying base 20 further includes a retaining groove 24 formed on the carrying body 21, and connected to the receiving groove 23. When the optical element 30 is disposed in the receiving groove 23, glue may be filled in the retaining groove 24 so as to affix the optical element 30 to the carrying base 20. In some embodiments, the optical element 30 may extend into the retaining groove 24 to securely affix to the carrying base 20.

In this embodiment, the main base 10 further includes a position portion 18 disposed on the bottom plate 13. The position portion 18 may correspond to the shape of the bottom of the carrying base 20, so as to limit the movement of the carrying base 20 in the main base 10.

The rotation mechanism 40 is disposed in the main base 10, and the carrying base 20 is connected to the rotation mechanism 40. In this embodiment, the rotation mechanism 40 includes elastic elements 41 and bias wires 42.

In this embodiment, the elastic elements 41 are disposed between the main base 10 and the carrying base 20, and located on two opposite sides of the carrying base 20. The elastic elements 41 are configured to provide elastic force to the main base 10 and the carrying base 20. The elastic elements 41 may be torsion springs, elastic sheets, elastic materials, or flexible structures. The ends of the pivoting portions 22 are connected to the elastic elements 41. Therefore, when the rotation mechanism 40 is rotated, the carrying base 20 can be returned to an initial position by the elastic force of the elastic element 41.

In this embodiment, there are two bias wires 42, but it is not limited thereto. One of the bias wires 42 is adjacent to the first side wall 11, and the other one of the bias wires (second bias wire) 42 is adjacent to the second side wall 12. The bias wires 42 are connected to the main base 10 and the carrying base 20. The bias wires 42 may be extended linearly, and the extension direction of the bias wires 42 may be perpendicular to the first rotation axis AX2. In this embodiment, by changing the length of the bias wires 42 of the rotation mechanism 40, the carrying base 20 can be rotated relative to the main base 10 about the first rotation axis AX2.

In some embodiments, the bias wires 42 are located at two opposite sides of the carrying base 20, and are symmetrically arranged about the carrying base 20. In other words, the bias wires 42 and the carrying base 20 are arranged in an extension direction D1 parallel to the first rotation axis AX2. The bias wires 42 are linearly extended in the same direction, and located on an imaginary plane, which is parallel to the first rotation axis AX2.

The main base 10 includes connection portions (first connection portions) 14. The connection portions 14 may be disposed on the first side wall 11, the second side wall 12 and/or the bottom plate 13, and may be located in the receiving space S1. In this embodiment, the connection portions 14 are adjacent to the connection location of the first side wall 11 and the bottom plate 13, and adjacent to the connection location of the second side wall 12 and the bottom plate 13.

The carrying base 20 further includes connection portions (second connection portions) 25. The connection portions 25 may be disposed on two opposite sides of the carrying body 21, and located in the receiving space S1. The bias wires 42 are connected to the connection portions 14 of the main base 10 and the connection portions 25 of the carrying base 20. In some embodiments, ends of the bias wires 42 may be around the connection portions 14 and the connection portions 25, and slidably connected to the connection portions 14 and the connection portion 25.

The camera module A30 further includes connection wires W11, W12 and W13 disposed on the main base 10 and the carrying base 20. In some embodiments, connection wires W11, W12 and W13 may be formed on the main base 10 and the carrying base 20 by printing or coating. In some embodiments, the connection wires W11, W12 and W13 are formed on the main base 10 and the carrying base 20 by the manufacturing method of the molded interconnect device (MID). In some embodiments, the connection wires W11, W12 and W13 are formed on the main base 10 and the carrying base 20 by laser direct structuring (LDS). In this embodiment, the connection wire W11 may be disposed on the bottom plate 13 and the first side wall 11 of the main base 10. The connection wire W13 may be disposed on the bottom plate 13 and the second side wall 12 of the main base 10. The connection wire W12 is disposed on the carrying body 21 of the carrying base 20. Two ends of the connection wire W12 are extended to the connection portion 25 of the carrying base 20.

In some embodiments, the connection wires W11 and 13 are extended to the connection portion 14 of the main base 10, and connected to the first conductive end 421 of the bias wire 42. The connection wire W12 may be extended to the connection portion 25 of the carrying base 20. Therefore, one end of the connection wire W12 is connected to the second conductive end 422 of one of the bias wires 42, and the other end of the connection wire W12 is connected to the second conductive end 422 of the other one of the bias wires (second bias wire) 42.

In this embodiment, the bias wires 42 and the connection wires W11, W12 and W13 form a circuit. A power source P1 may be connected to the connection wires W11 and W13, and applies current to the bias wires 42 and the connection wires W11, W12 and W13.

In this embodiment, the bias wires 42 may be made by shape memory alloys (SMA). Therefore, when the power source P1 applies voltage to the bias wire 42 via the first conductive end 421 and the second conductive end 422, the length of the bias wires 42 change. For example, when the voltage is greater, the temperature of the bias wires 42 is greater. When the temperature of the bias wires 42 is greater, the length of the bias wires 42 is shorter.

The first conductive end 421 of the bias wire 42 is connected to the connection portion 14 of the main base 10, and the second conductive end 422 is connected to the connection portion 25 of the carrying base 20. Therefore, the bias wire 42 can generate a pulling force to make the carrying base 20 rotate relative to the main base 10 about the first rotation axis AX2 and in a first rotation direction R1, when the length of the bias wire 42 shortens. The pulling force may be greater than the elastic force generated by the elastic element 41. Moreover, the voltage applied to the bias wire 42 by the power source P1 can be adjusted to change the pulling force, and thus the carrying base 20 and the optical element 30 can be rotated to a predetermined location.

When the power source P1 stops applying voltage to the bias wire 42, the temperature of the bias wire 42 will be decreased, and thus the length of the bias wire 42 becomes longer. Due to the longer bias wire 42, the pulling force of the bias wire 42 applied to the main base 10 and the carrying base 20 is removed. Therefore, the carrying base 20 can be returned to an initial position by the elastic force of the elastic element 41.

According to the design of the optical device A31 of the present disclosure, the function of the optical image stabilization of the portable electronic equipment A1 can be archived by adjusting the rotation angle of the optical element 30, when the user takes pictures using the portable electronic equipment A1. Moreover, since the rotation mechanism 40 of the present disclosure excludes magnetic elements and drive coils, a magnetic field will not generated when the rotation mechanism 40 drives the optical element 30 to rotate relative to the main base 10. Therefore, electromagnetic interference inside the portable electronic equipment A1 is reduced, and thus the quality of the portable electronic equipment A1 can be improved.

Figure 3D:
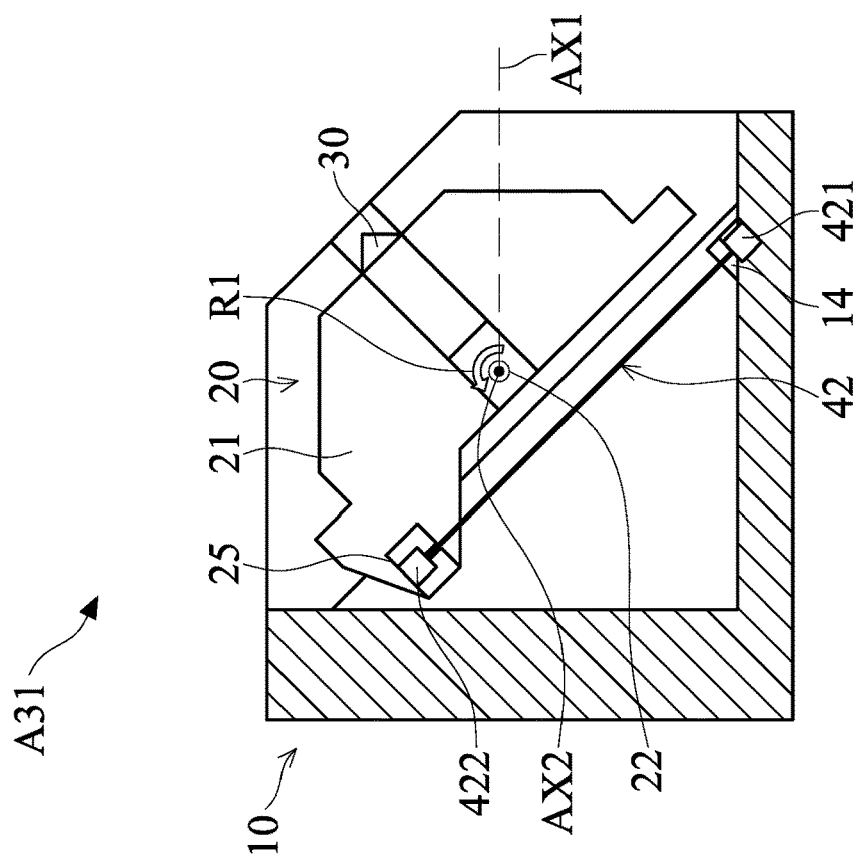
FIG. 3D is a schematic view of the optical device in accordance with the second embodiment of the present disclosure.

FIG. 3D is a schematic view of the optical device A31 in accordance with the second embodiment of the present disclosure. In this embodiment, the bias wire 42 is extended in an extension direction D2. The extension direction D2 may be substantially perpendicular to the light axis AX1. In other words, the connection portion 14 and the connection portion 25 may be substantially arranged in the extension direction D2. Therefore, the torque of the pulling force, generated by the bias wire 42, relative to the first rotation axis AX2 is increased, and thus a larger force can be applied to rotating the carrying base 20.

In this embodiment, the rotation mechanism 40 further includes a bias wire (third bias wire) 42a. The main base 10 further includes a connection portion 15. The carrying base 20 further includes a connection portion 26. Two ends of the bias wire 42a are connected to the connection portion 15 and the connection portion 26. The pivoting portion 22 is located between the connection portion 25 and the connection portion 26.

The power source P1 may selectively apply voltage to the bias wire 42 and the bias wire 42a. When the power source P1 applies voltage to the bias wire 42, the length of the bias wire 42 is shorter, and thus the carrying base 20 and the optical element 30 are rotated in the first rotation direction R1. When the power source P1 applies voltage to the bias wire 42a, the length of the bias wire 42a is shorter, and thus the carrying base 20 and the optical element 30 are rotated in the second rotation direction R2, which is contrary to the first rotation direction R1. Therefore, the carrying base 20 and the optical element 30 can be rotated to a predetermined location by adjusting the voltage of the power source P1 applied to the bias wire 42 and the bias wire 42a.

Figure 4A:
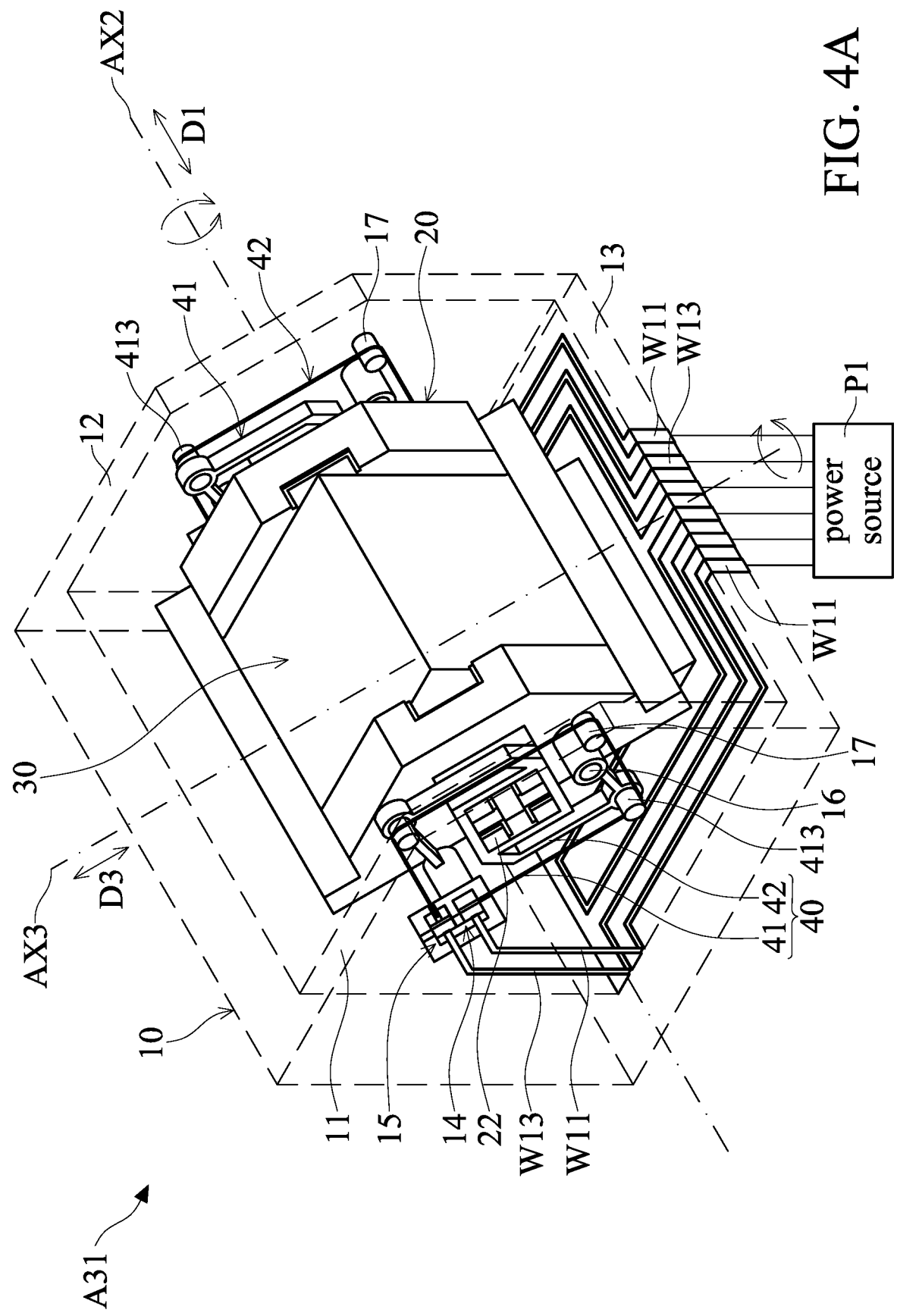
FIG. 4A is a perspective view of an optical device in accordance with the third embodiment of the present disclosure.
Figure 4B:
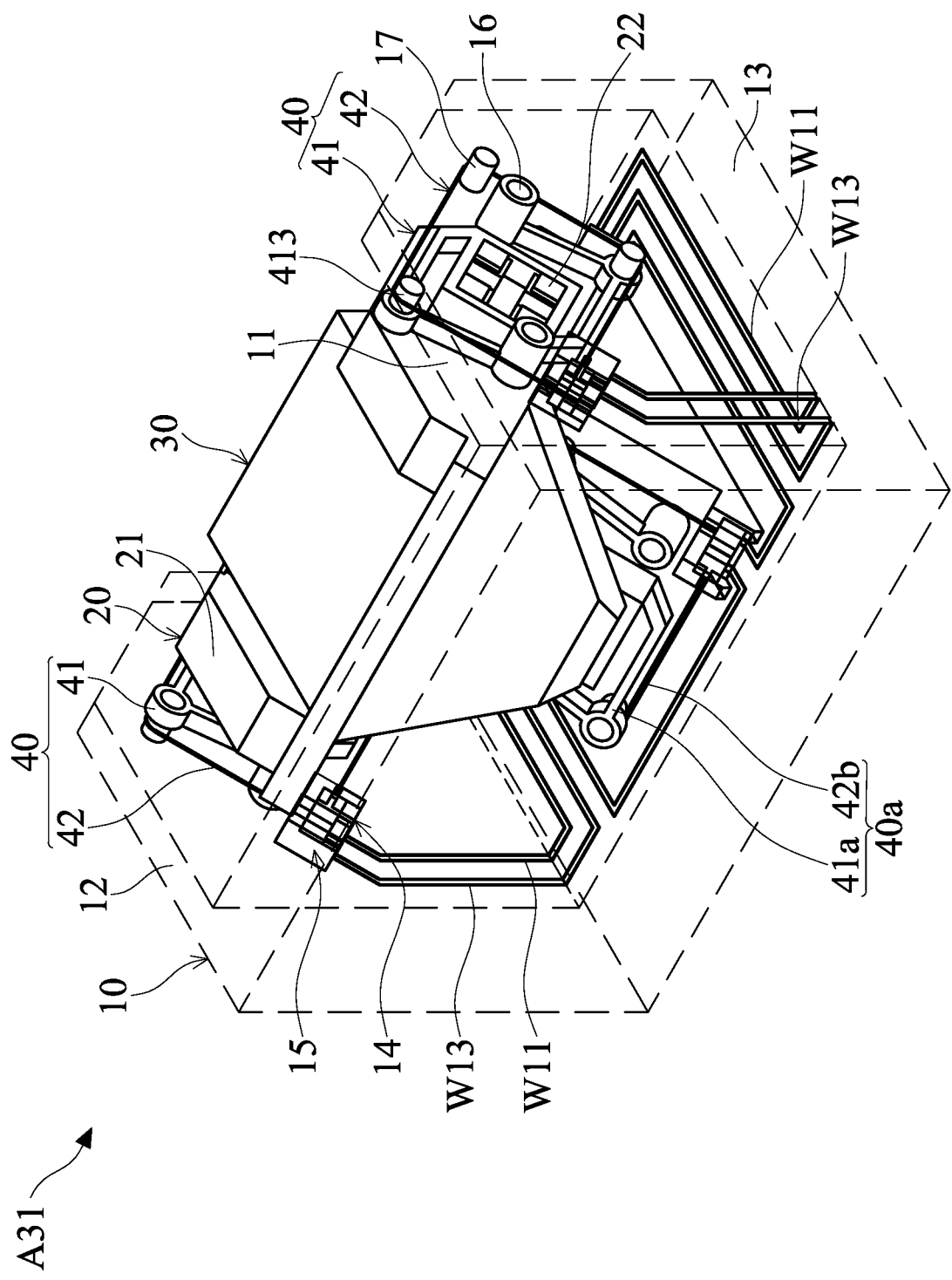
FIG. 4B is another perspective view of the optical device in accordance with the third embodiment of the present disclosure.
Figure 4C:
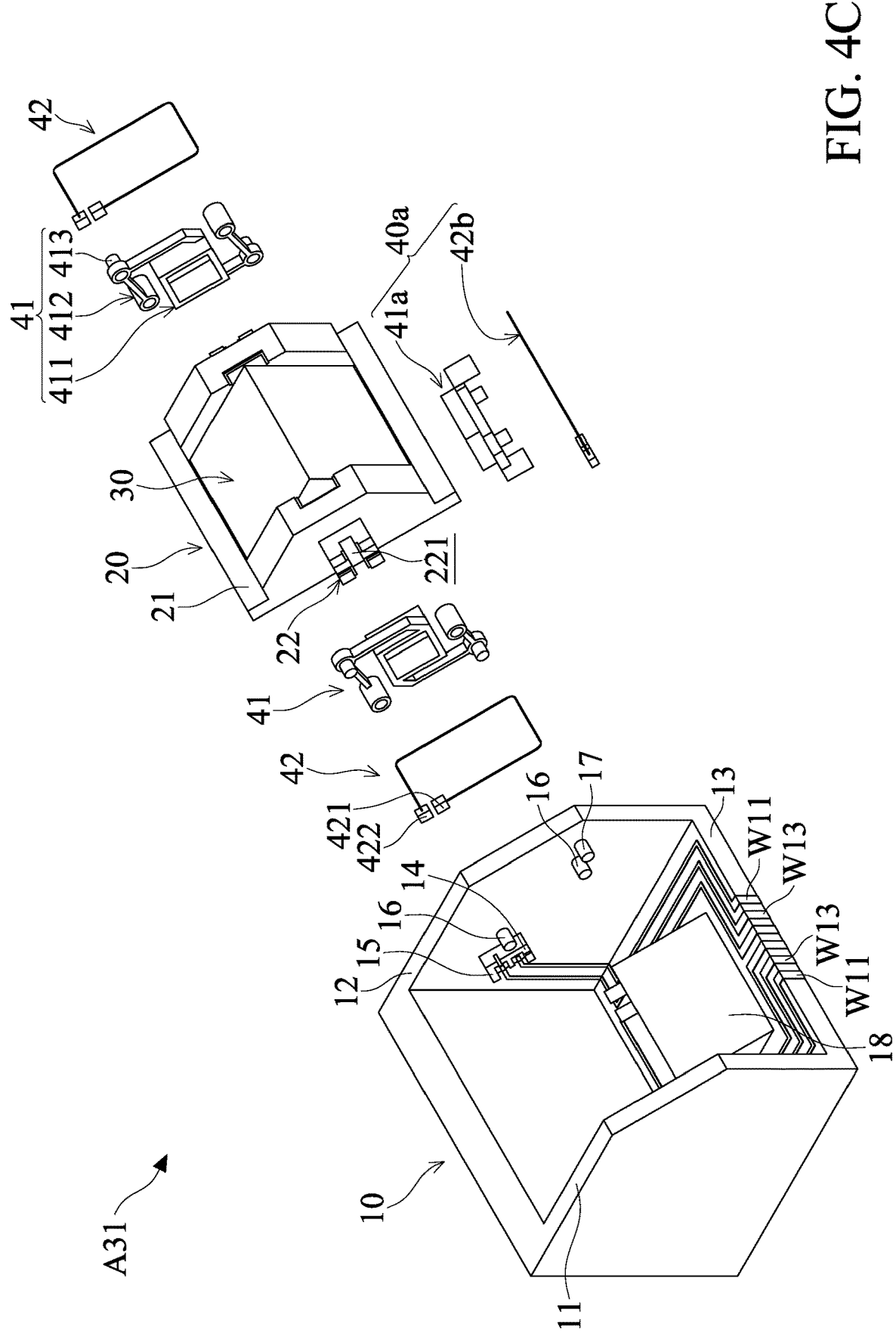
FIG. 4C is an exploded view of the optical device in accordance with the third embodiment of the present disclosure.
Figure 4D:
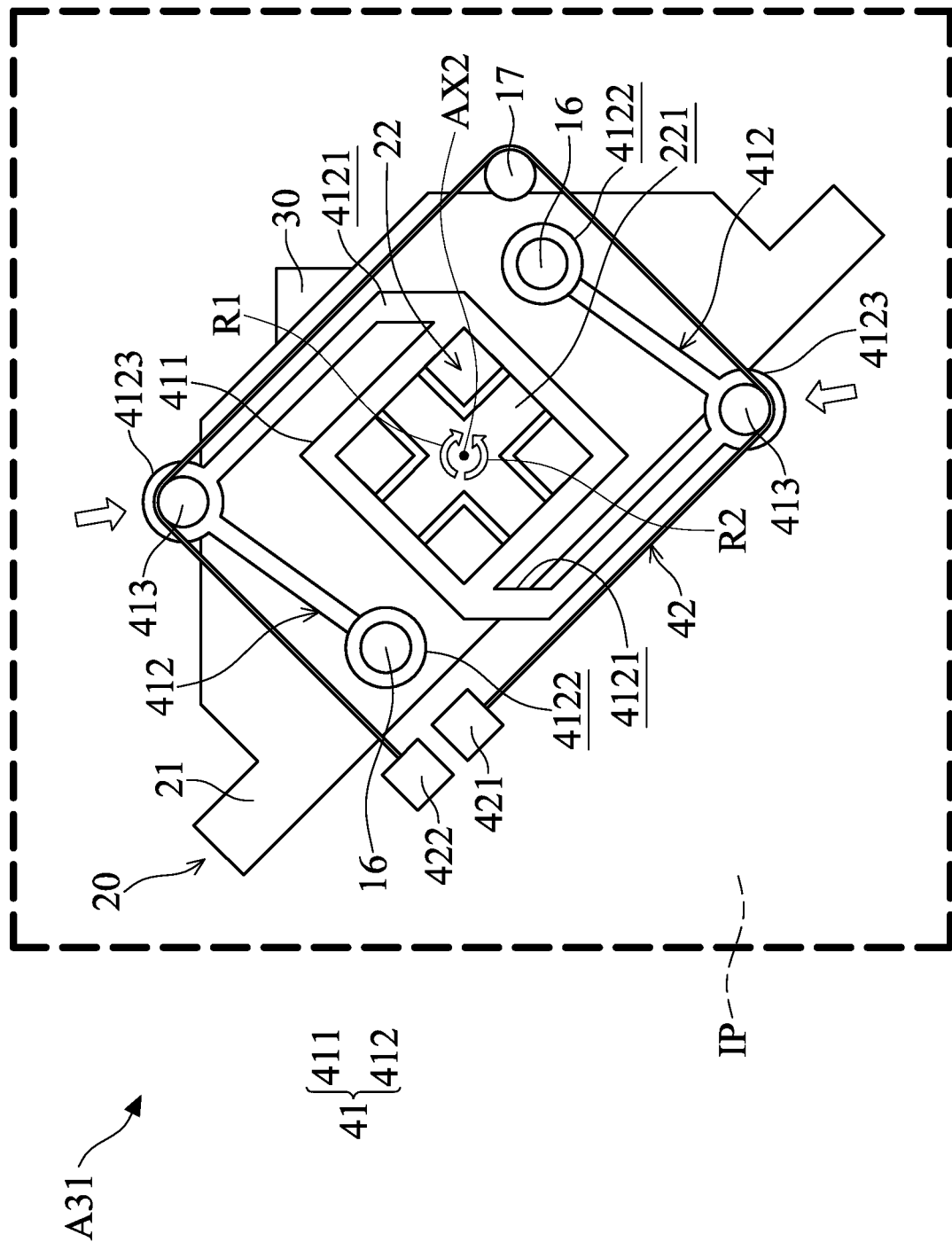
FIG. 4D is a schematic view of the optical device in accordance with the third embodiment of the present disclosure.

FIG. 4A is a perspective view of an optical device A31 in accordance with the third embodiment of the present disclosure. FIG. 4B is another perspective view of the optical device A31 in accordance with the third embodiment of the present disclosure. FIG. 4C is an exploded view of the optical device A31 in accordance with the third embodiment of the present disclosure. FIG. 4D is a schematic view of the optical device A31 in accordance with the third embodiment of the present disclosure.

In this embodiment, the main base 10 includes connection portions 14, connection portions 15, and fixed portions 16. The connection portions 14 and the connection portions 15 may be disposed on the first side wall 11 and the second side wall 12, and the connection portions 14 are adjacent to the connection portions 15.

The connection wires W11 and W13 are extended to the connection portions 14 and the connection portions 15. The first conductive ends 421 of the bias wires 42 are connected to the connection portions 14, and connected to the connection wires W11. The second conductive ends 422 of the bias wires 42 are connected to the connection portions 15, and connected to the connection wires W13. Therefore, the bias wires 42 and the connection wires W11 and W13 operate as a circuit connected to the power source P1. Moreover, the fixed portions 16 are disposed on the first side wall 11 and the second side wall 12, and connected to the elastic elements 41.

In this embodiment, the connection portions 14 and the connection portions 15 are grooves. The first conductive ends 421 and the second conductive ends 422 of the bias wires 42 are retained in the connection portions 14 and the connection portions 15.

In some embodiments, the bias wires 42 are located at two opposite sides of the carrying base 20, and are symmetrically arranged about the carrying base 20. The bias wire 42 and the carrying base 20 are arranged in an extension direction D1, which is parallel to the first rotation axis AX2. Moreover, each bias wire 42 is located on an imaginary plane IP, and the imaginary plane IP is not parallel to the first rotation axis AX2. In some embodiments, the imaginary plane IP is perpendicular to the first rotation axis AX2.

The elastic element 41 is disposed on the pivoting portion 22 of the carrying base 20, and connected to the main base 10. The bias wire 42 is around the elastic element 41. The elastic element 41 may be made from the elastic material, such as rubber. When the length of the bias wire 42 is shortened, the bias wire 42 deforms the elastic element 41, and the carrying base 20 is rotated by the deformation of the elastic element 41.

In this embodiment, the elastic element 41 includes an elastic body 411, elastic arms 412, and movable portions 413. The elastic body 411 is disposed on or affixed to the pivoting portion 22 of the carrying base 20. The elastic body 411 may be a ring-like structure around the pivoting portion 22.

In some embodiments, the elastic body 411 is a circle, an ellipse, or a polygon, but it is not limited thereto. In this embodiment, the elastic body 411 may be quadrangle. In some embodiments, the pivoting portion 22 has a glue groove 221. The elastic element 41 can be affixed to the pivoting portion 22 by filling glue in the glue groove 221.

The elastic arms 412 may be connected to two opposite sides of the elastic element 41. In this embodiment, the elastic arms 412 are spirally extended from the elastic element 41. The connection ends 4121 of the elastic arms 412 are connected to the elastic body 411. The far ends 4122 of the elastic arms 412 are connected to the fixed portions 16 of the main base 10. Moreover, the elastic arms 412 have bend portions 4123 substantially located at central areas of the elastic arms 412, and the elastic arms 412 are bended at the bend portions 4123.

The movable portions 413 are disposed on the bend portions 4123 of the elastic arm 412. The movable portions 413 may be made from rigid materials, such as metal or hard plastic. The main base 10 includes limitation portions 17 disposed on the first side wall 11 and the second side wall 12, and configured to limit the position of the bias wires 42. The bias wires 42 are in slidable contact with the limitation portions 17 and the movable portions 413.

The bias wires 42 are in contact with and around the movable portions 413 and the limitation portions 17. Moreover, the first conductive ends 421 and the second conductive ends 422 of the bias wires 42 are affixed to the main base 10. Therefore, when the length of the bias wires 42 are shorted, the bias wires 42 move the movable portions 413 toward the pivoting portions 22 and deform the elastic arms 412, so as to rotate the elastic body 411. Moreover, since the far ends 4122 of the elastic arms 412 are affixed to the fixed portions 16 of the main base 10, the carrying base 20 and the optical element 30 are rotated about the first rotation direction R1 by the rotation of the elastic body 411. Therefore, the carrying base 20 and the optical element 30 can be rotated to a predetermined location by adjusting the voltage of the power source P1 provided to the bias wires 42.

When the power source P1 stops applying voltage to the bias wires 42, the length of the bias wires 42 becomes longer. The elastic element 41 is returned to its undeformed state, and thus the carrying base 20 and the optical element 30 are rotated in the second rotation direction R2 and return to their initial position.

As shown in FIG. 4B and 4C, the optical device A31 further includes a rotation mechanism (second rotation mechanism) 40a. The design of the rotation mechanism 40a may be according to the described rotation mechanisms 40 of the present disclosure. The rotation mechanism 40a is connected to the main base 10 and the carrying base 20. In this embodiment, the rotation mechanism 40a is located between the bottom plate 13 of the main base 10 and the carrying base 20.

The rotation mechanism 40a includes a bias wire (fourth bias wire) 42b connected to the main base 10 and the carrying base 20. By changing the length of the bias wire 42b of the rotation mechanism 40a, the carrying base 20 is rotated relative to the main base 10 about a second rotation axis AX3 (as shown in FIG. 4A). The second rotation axis AX3 is extended in an extension direction D3. The second rotation axis AX3 is perpendicular to first rotation axis AX2, and the extension direction D2 is perpendicular to the extension direction D3.

The pulling force can be changed by adjusting the voltage applied to the bias wire 42b, and the carrying base 20 and the optical element 30 can be rotated to a predetermined location. When the power source P1 stops applying the voltage to the bias wire 42b, the length of the bias wire 42b is increased, and the pulling force applied to the main base 10 and the carrying base 20 by the bias wire 42b is removed. Therefore, the carrying base 20 can be returned to its initial position by the elastic force of the elastic element 41a of the rotation mechanism 40a.

Accordingly, the function of the optical image stabilization of the portable electronic equipment A1 can be improved by the rotation mechanism 40 and the rotation mechanism 40a.

Figure 5A:
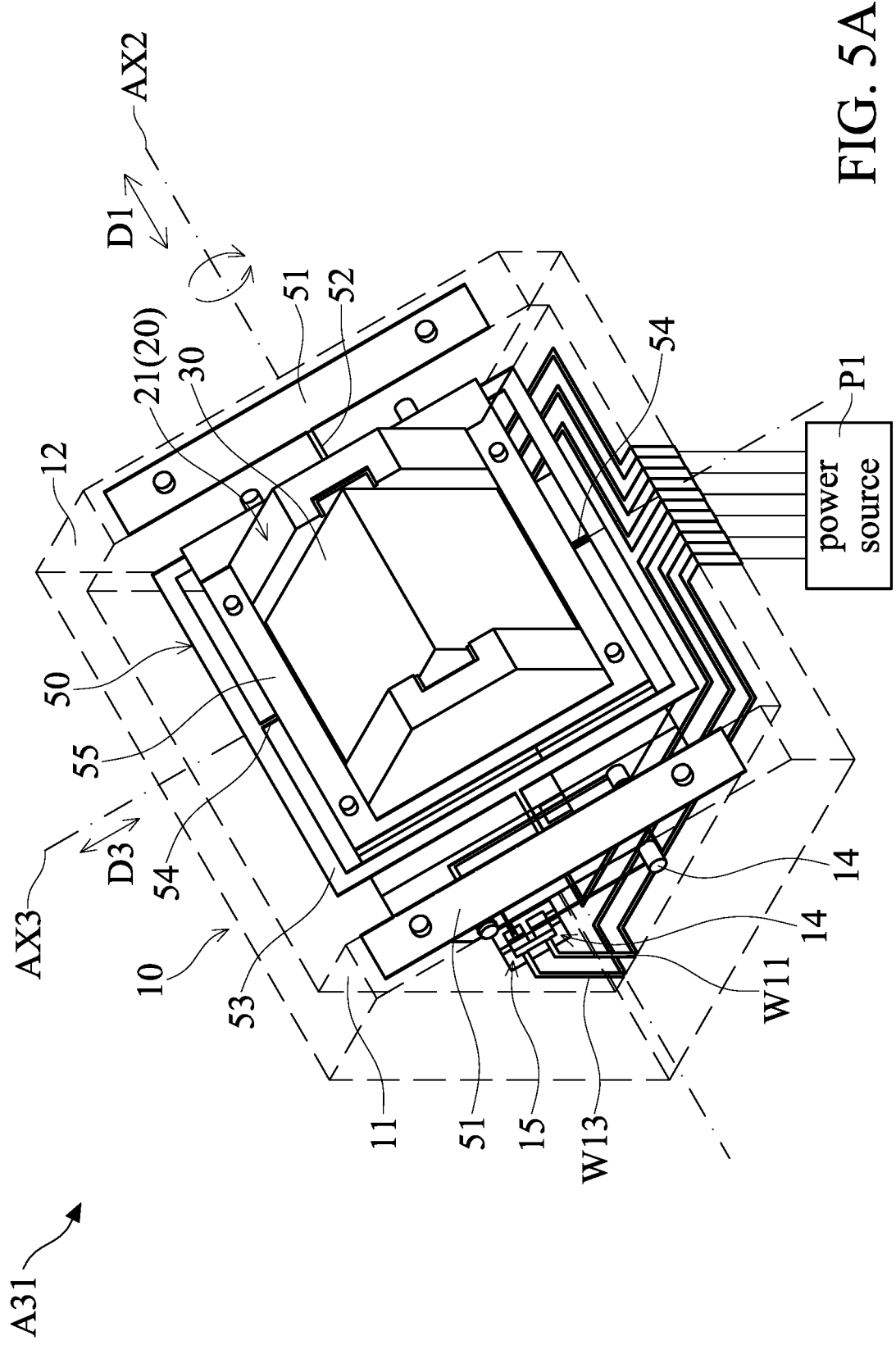
FIG. 5A is a perspective view of an optical device in accordance with the fourth embodiment of the present disclosure.
Figure 5B:
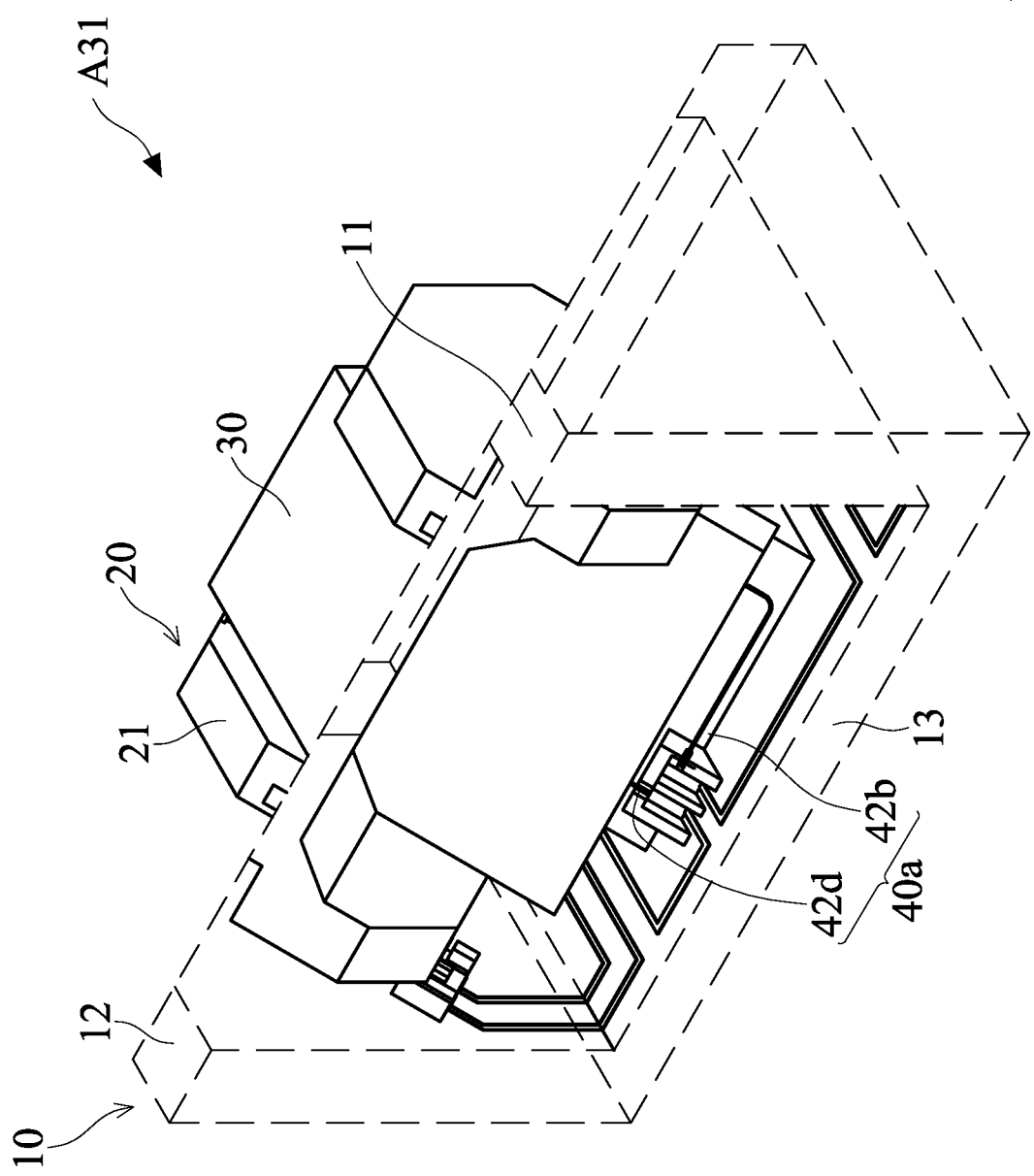
FIG. 5B is another perspective view of the optical device in accordance with the fourth embodiment of the present disclosure.
Figure 5C:
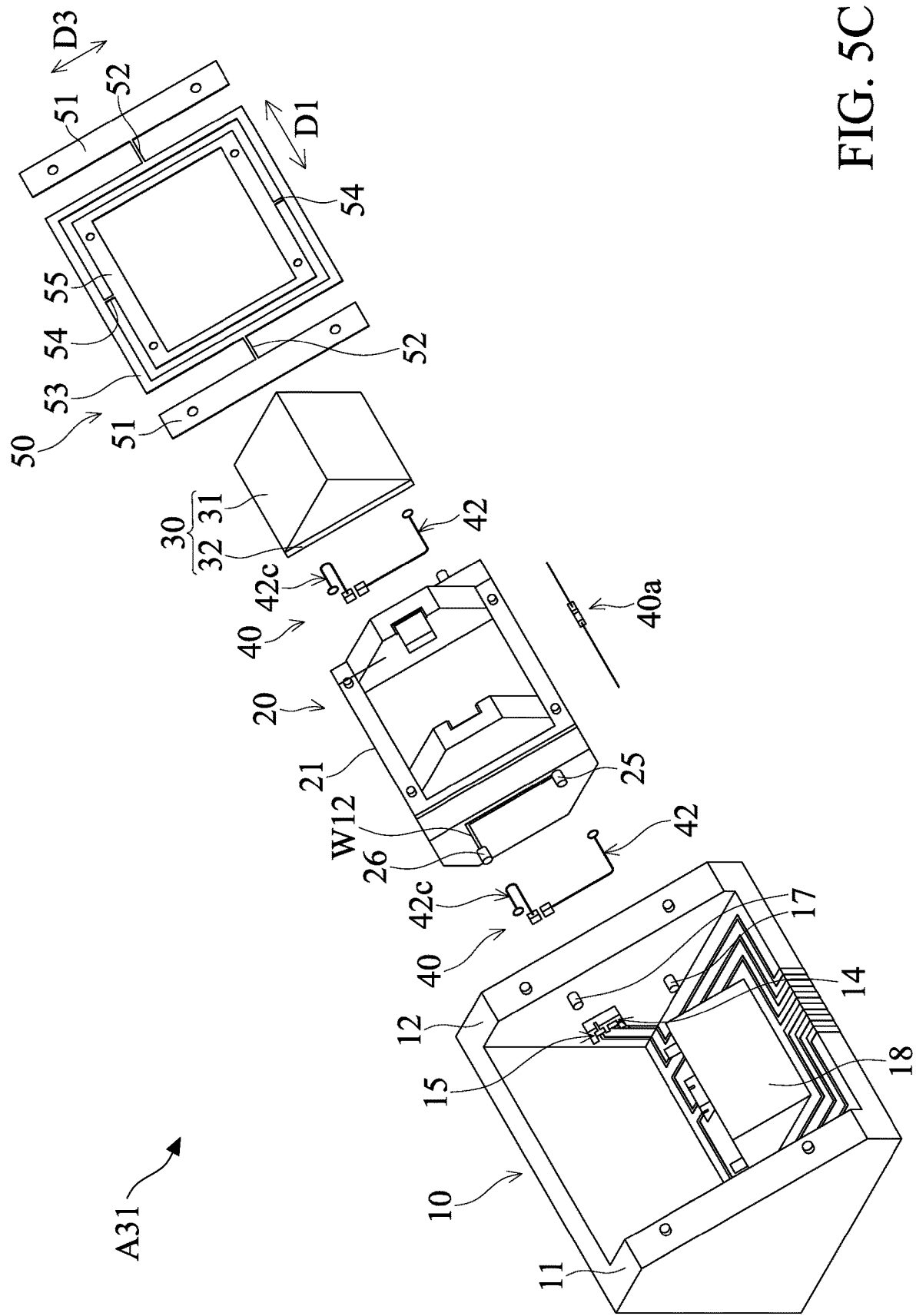
FIG. 5C is an exploded view of the optical device in accordance with the fourth embodiment of the present disclosure.
Figure 5D:
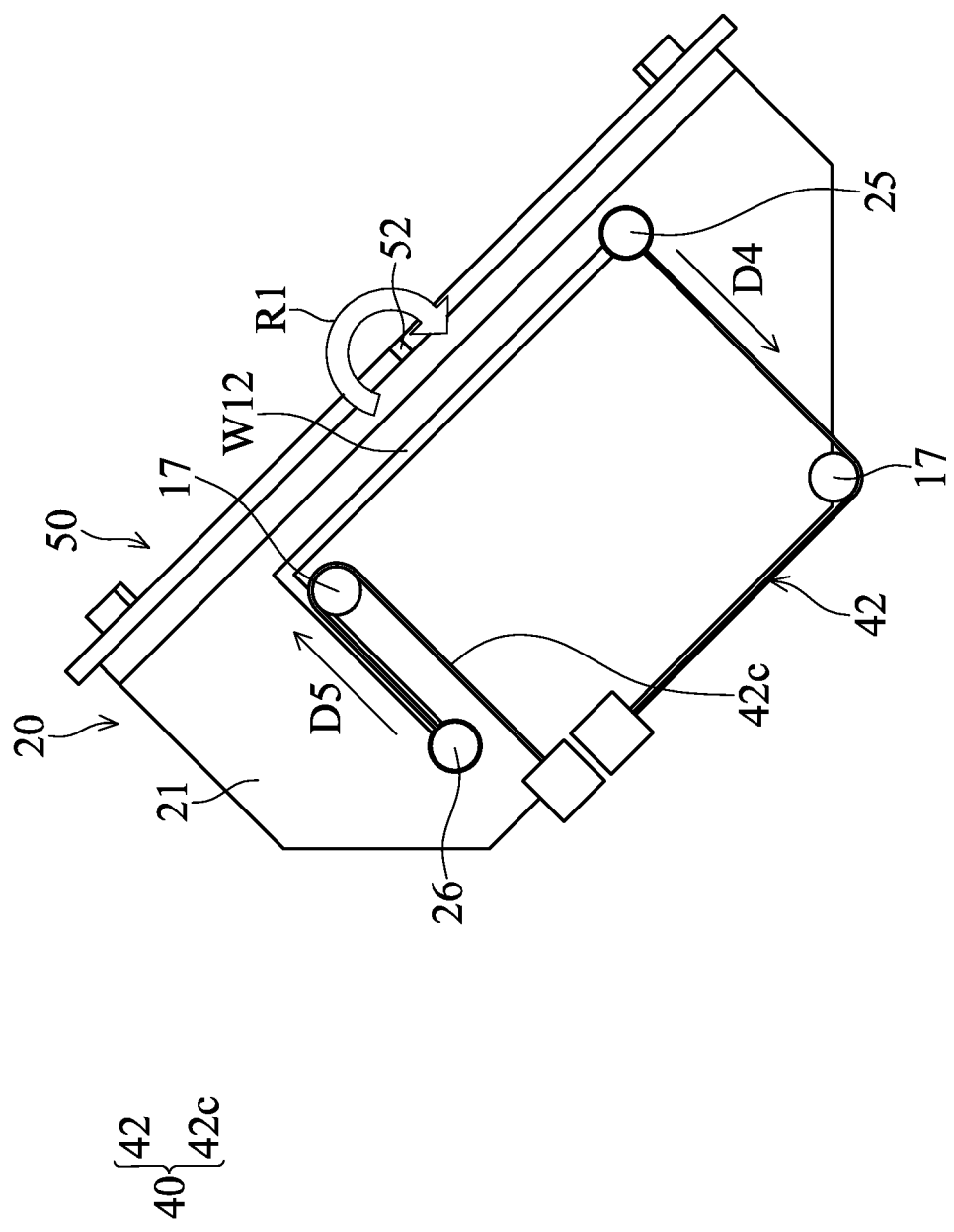
FIG. 5D is a schematic view of the optical device in accordance with the fourth embodiment of the present disclosure.

FIG. 5A is a perspective view of an optical device A31 in accordance with the fourth embodiment of the present disclosure. FIG. 5B is another perspective view of the optical device A31 in accordance with the fourth embodiment of the present disclosure. FIG. 5C is an exploded view of the optical device A31 in accordance with the fourth embodiment of the present disclosure. FIG. 5D is a schematic view of the optical device A31 in accordance with the fourth embodiment of the present disclosure.

In this embodiment, the optical device A31 further includes an elastic sheet 50 disposed on the main base 10 and the carrying base 20, and configured to provides a pre-pressing between the main base 10 and the carrying base 20. The elastic sheet 50 is located on an imaginary plane. The elastic sheet 50 may be made of a metal plate by stamping.

The elastic sheet 50 includes two fixed sheets 51, two shaft portions 52, a retaining sheet 53, two shaft portions 54, and a fixed sheet 55. The fixed sheets 51, the shaft portions 52, the retaining sheet 53, the shaft portions 54, and the fixed sheet 55 are located on an imaginary plane.

The fixed sheets 51 are affixed to the first side wall 11 and the second side wall 12 of the main base 10. The shaft portions 52 are connected to the fixed sheets 51 and the retaining sheet 53. The shaft portions 52 are extended along the first rotation axis AX2. Therefore, the carrying base 20 are rotated relative to the main base 10 about the shaft portion 52 and the first rotation axis AX2. After the carrying base 20 is rotated from the initial position to a predetermined location relative to the main base 10, the carrying base 20 can be returned to the initial position by the elastic force of the elastic sheet 50.

The retaining sheet 53 is connected to the shaft portion 52 and the shaft portion 54, and the fixed sheet 55 are affixed to the carrying base 20. The shaft portion 54 is extended along the second rotation axis AX3. Therefore, the carrying base 20 can be rotated relative to the main base 10 along the shaft portion 54 and the second rotation axis AX3. After the carrying base 20 is rotated from the initial position to another predetermined location relative to the main base 10, the carrying base 20 can be returned to its initial position by the elastic force of the elastic sheet 50.

In this embodiment, one end of the bias wire 42 is connected to the connection portion 14 of the main base 10, and the other end of the bias wire 42 is connected to the connection portion 25 of the carrying base 20. The bias wire 42 is in slidable contact with the limitation portion 17 of the main base 10. The connection wire W12 is disposed on the carrying base 20, and connected to the bias wire 42 and the bias wire (second bias wire) 42c. One end of the bias wire 42c is connected to the connection portion 15 of the main base 10, and the other end of the bias wire 42c is connected to the connection portion 26 of the carrying base 20. The bias wire 42 is in slidable contact with the limitation portion 17 of the main base 10. Therefore, the bias wire 42, the connection wire W12, and the bias wire 42c form a circuit.

When voltage are applied to the bias wire 42 and the bias wire 42c, the length of the bias wire 42 and the bias wire 42c is shortened. As shown in FIG. 5D, the bias wire 42 pulls the connection portion 25 in the pulling direction D4, and the bias wire 42c pulls the connection portion 26 in the second pulling direction D5. Therefore, by the pulling force of the bias wire 42 and the bias wire 42c, the carrying base 20 can be rotated relative to the main base 10 about the shaft portion 52 and the first rotation axis AX2. The pulling force can be change by adjusting the voltage of the power source P1 applying to the bias wire 42 and the bias wire 42c, so as to rotate the carrying base 20 and the optical element 30 to a predetermined location.

When the power source P1 stops applying voltage to the bias wire 42 and the bias wire 42c, the length of the bias wire 42 and the bias wire 42c is increased, and the pulling force applied to the main base 10 and the carrying base 20 by the bias wire 42 and the bias wire 42c is removed. Therefore, the carrying base 20 can be returned to its initial position by the elastic force of the elastic sheet 50.

In some embodiments, the bias wire 42 and the bias wire 42c are located on an imaginary plane, and the imaginary plane is not parallel to the first rotation axis AX2. In some embodiments, the imaginary plane is perpendicular to the first rotation axis AX2.

As shown in FIG. 5B, the camera module A30 further includes a rotation mechanism (second rotation mechanism) 40a. The design of the rotation mechanism 40a may be according to the described rotation mechanisms 40 of the present disclosure. The rotation mechanism 40a is connected to the main base 10 and the carrying base 20. In this embodiment, the rotation mechanism 40a is located between the bottom plate 13 of the main base 10 and the carrying base 20.

As shown in FIG. 5A and 5B, the rotation mechanism 40a includes a bias wire (fourth bias wire) 42b and a bias wire 42d. The bias wire 42b and the bias wire 42d are connected to the main base 10 and the carrying base 20. By changing the length of the bias wire 42b and the bias wire 42d of the rotation mechanism 40a, the carrying base 20 can be rotated relative to the main base 10 by the second rotation axis AX3 and the shaft portion 54.

The pulling force can be changed by adjusting the voltage applied to the bias wire 42b and the bias wire 42d, and the carrying base 20 and the optical element 30 can be rotated to a predetermined location. When the power source P1 stops applying the voltage to the bias wire 42b and the bias wire 42d, the length of the bias wire 42b and the bias wire 42d is increased, and the pulling force applied to the main base 10 and the carrying base 20 by the bias wire 42b and the bias wire 42d is removed. Therefore, the carrying base 20 can be returned to its initial position by the elastic force of the elastic sheet 50.

Accordingly, the function of the optical image stabilization of the portable electronic equipment A1 can be improved by the rotation mechanism 40 and the rotation mechanism 40a.

FIG. 6 is a perspective view of an optical device A31 in accordance with the fifth embodiment of the present disclosure. In this embodiment, the carrying base 20 is rotated relative to the main base 10 about the first rotation axis AX2 via the rotation mechanism 40, and/or rotated relative to the main base 10 about the second rotation axis AX3 via the rotation mechanism 40a (as shown in FIG. 4B and 5B). The design of the rotation mechanism 40 and/or the rotation mechanism 40a may be according to the described embodiments of the present disclosure.

The optical device A31 of the present disclosure further includes an outer main base 60 movably disposed on the main base 10. In this embodiment, the main base 10 is located in the outer main base 60. The rotation mechanism (third rotation mechanism) 40b is connected to the main base 10 and the outer main base 60. The rotation mechanism 40b is configured to rotate the main base 10 relative to the outer main base 60 about a third rotation axis AX4. The design of the rotation mechanism 40b may be according to the rotation mechanism 40 and/or the rotation mechanism 40a of the described embodiments of the present disclosure.

The third rotation axis AX4 may not be parallel to the first rotation axis AX2 and the second rotation axis AX3. In some embodiments, the third rotation axis AX4 is perpendicular to the first rotation axis AX2. The third rotation axis AX4 may be perpendicular to the second rotation axis AX3, or inclined relative to the second rotation axis AX3.

The rotation mechanism 40b includes a bias wire 42e connected to the main base 10 and the outer main base 60. By changing the length of the bias wire 42e of the rotation mechanism 40b, the main base 10 can be rotated relative to the outer main base 60 about the third rotation axis AX4.

Accordingly, the portable electronic equipment A1 of the present disclosure provides better optical image stabilization control using the rotation mechanism 40b.

The disclosed features may be combined, modified, or replaced in any suitable manner in one or more disclosed embodiments, but are not limited to any particular embodiments.

In conclusion, the optical device of the present disclosure can be disposed in the portable electronic equipment and provide the function of optical image stabilization. Moreover, the length of bias wire can be adjusted by applying voltage to the bias wire, and the optical element of the optical device can be rotated by changing the length of bias wire. Therefore, the optical device does not utilize a mechanism, which generates electromagnetic field to archive the optical-image-stabilization function, and thus the quality of the image generated by the optical device is improved.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical module, comprising:
    a first optical element driving mechanism, comprising:
        a first movable portion connecting an optical path adjustment element, wherein the optical path adjustment element is configured to change a transmission direction of incident light to a first direction that is different from the transmission direction;
        a first fixed portion, wherein the first fixed potion is polygonal when viewed in the transmission direction, and the first movable portion is movable relative to the first fixed portion; and
        a first driving assembly driving the first movable portion to move relative to the first fixed portion, comprising a shape memory alloy;
        wherein the first driving assembly is located on a first side of the first fixed portion when viewed in the transmission direction;
    wherein the first driving assembly further comprises a bias wire made of the shape memory alloy, the bias wire comprises a first conductive end and a second conductive end, wherein a power source provides voltage to the bias wire via the first conductive end and the second conductive end, so as to change a length of the bias wire.

2. The optical module as claimed in claim 1, wherein the first movable portion further comprises a carrying base and a main base, and the carrying base is rotated relative to the main base about a first rotation axis by changing the length of the bias wire.

3. The optical module as claimed in claim 2, wherein the carrying base is pivoted on the main base, and the bias wire has a first conductive end connected to the main base, and a second conductive end connected to the carrying base.

4. The optical module as claimed in claim 2, wherein the main base further comprises a first connection portion, and the carrying base further comprises a second connection portion, wherein the bias wire is connected to the first connection portion and the second connection portion.

5. The optical module as claimed in claim 2, further comprising an elastic sheet disposed on the main base and the carrying base, and configured to provide an elastic force between the main base and the carrying base.

6. The optical module as claimed in claim 2, wherein the bias wire is located on an imaginary plane, and the imaginary plane is not parallel to the first rotation axis.

7. The optical module as claimed in claim 2, further comprising an elastic element, the elastic element comprising:
    an elastic body disposed on the carrying base;
    an elastic arm connected to the elastic body; and
    a movable portion disposed on the elastic arm;
    wherein the bias wire is in contact with the movable portion, and when the length of the bias wire is shorter, the bias wire moves the movable portion so as to rotate the elastic body.

8. The optical module as claimed in claim 7, wherein the main base further comprises a fixed portion, and a far end of the elastic arm is connected to the fixed portion.

9. The optical module as claimed in claim 7, wherein the main base comprises a limitation portion, and the bias wire is in slidable contact with the limitation portion.

10. The optical module as claimed in claim 1, wherein the first side comprises a first side surface facing the first driving assembly, and the first side surface is parallel with the transmission direction.

11. An optical module, comprising:
    a first optical element driving mechanism, comprising:
        a first movable portion connecting an optical path adjustment element, wherein the optical path adjustment element is configured to change a transmission direction of incident light to a first direction that is different from the transmission direction;
        a first fixed portion, wherein the first fixed potion is polygonal when viewed in the transmission direction, and the first movable portion is movable relative to the first fixed portion; and
        a first driving assembly driving the first movable portion to move relative to the first fixed portion, comprising a shape memory alloy;
        wherein the first driving assembly is located on a first side of the first fixed portion when viewed in the transmission direction;
        wherein the first side comprises a first side surface facing the first driving assembly, and the first side surface is parallel with the transmission direction;
        wherein an arrangement direction of the first driving assembly and the first movable portion is not parallel with the transmission direction.

12. The optical module as claimed in claim 11, wherein the first optical element driving mechanism further comprises a circuit assembly electrically connected to the first driving assembly, a second side of the first fixed portion comprises a second side surface facing the circuit assembly, and the first side surface is not parallel with the second side surface.

13. The optical module as claimed in claim 11, wherein the first optical element driving mechanism further comprises a plurality of first driving assemblies, the first movable portion is located between the first driving assemblies when viewed in the transmission direction, and the first movable portion at least partially overlaps the first driving assemblies when viewed in an arrangement direction of the first driving assemblies.

14. The optical module as claimed in claim 13, wherein the arrangement direction of the first driving assemblies is different from the transmission direction.

15. An optical module, comprising:
a first optical element driving mechanism, comprising:
   a first movable portion connecting an optical path adjustment element, wherein the optical path adjustment element is configured to change a transmission direction of incident light to a first direction that is different from the transmission direction,
   a first fixed portion, wherein the first fixed potion is polygonal when viewed in the transmission direction, and the first movable portion is movable relative to the first fixed portion, and
   a first driving assembly driving the first movable portion to move relative to the first fixed portion, comprising a shape memory alloy,
a second optical element driving mechanism, comprising:
   a second movable portion connecting an optical element;
   a second fixed portion, wherein the second movable portion is movable relative to the second fixed portion; and
   a second driving assembly driving the second movable portion to move relative to the second fixed portion;
wherein the first driving assembly is located on a first side of the first fixed portion when viewed in the transmission direction,
wherein the first optical element driving mechanism and the second optical element driving mechanism are arranged along the first direction;
wherein the first driving assembly does not overlap the second driving assembly when viewed in the transmission direction.

16. The optical module as claimed in claim 15, wherein the second driving assembly further comprises a magnetic element and a coil.

17. The optical module as claimed in claim 1, wherein the first optical element driving mechanism further comprises an elastic element, and the first movable portion is movably connected to the first fixed portion via the elastic element.

18. The optical module as claimed in claim 17, wherein the elastic element is located on the first side.

19. The optical module as claimed in claim 17, wherein the first side comprises a first side surface facing the elastic element and the first driving assembly, and the first side surface is parallel with the transmission direction.

* * * * *